United States Patent
Miyata et al.

(10) Patent No.: US 7,578,713 B2
(45) Date of Patent: Aug. 25, 2009

(54) OUTBOARD ENGINE SYSTEM

(75) Inventors: Takahiro Miyata, Shizuoka (JP); Tokuji Yoshimoto, Shizuoka (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 99 days.

(21) Appl. No.: 11/802,779

(22) Filed: May 24, 2007

(65) Prior Publication Data
US 2007/0287338 A1 Dec. 13, 2007

(30) Foreign Application Priority Data

| May 25, 2006 | (JP) | ............................ 2006-145972 |
| May 25, 2006 | (JP) | ............................ 2006-145973 |
| May 25, 2006 | (JP) | ............................ 2006-145974 |

(51) Int. Cl.
*B63H 23/00* (2006.01)

(52) U.S. Cl. ....................................................... 440/75

(58) Field of Classification Search .................... 440/75
See application file for complete search history.

(56) References Cited

U.S. PATENT DOCUMENTS

| 3,407,600 A | 10/1968 | Meyer |
| 4,558,769 A | 12/1985 | Neisen |
| 4,867,641 A | 9/1989 | Okuno et al. |
| 4,887,984 A | 12/1989 | Newman |
| 5,018,996 A | 5/1991 | Newman et al. |
| 5,112,259 A | 5/1992 | McElroy, Jr. |
| 5,310,033 A * | 5/1994 | Shibayama ................ 192/3.29 |
| 2004/0216555 A1 | 11/2004 | Ide et al. |
| 2006/0000682 A1 | 1/2006 | Yamamoto et al. |

FOREIGN PATENT DOCUMENTS

EP 1 619 415 A2 1/2006

\* cited by examiner

*Primary Examiner*—Stephen Avila
(74) *Attorney, Agent, or Firm*—Arent Fox LLP

(57) ABSTRACT

An outboard engine system includes a casing and an engine mounted in an upper part of the casing. The casing also contains a torque converter, and a vertically arranged output shaft connected to a crankshaft through the torque converter. In the torque converter, a turbine runner is arranged above a pump impeller and connected to the output shaft, and a transmission cover is connected to an outer periphery of the pump impeller so as to cover an upper surface of the turbine runner. A drive plate is secured at its central portion to a lower end of the crankshaft by a first bolt, and an outer peripheral portion of the drive plate is secured to the transmission cover by a second bolt. The torque converter is suspended from the crankshaft via the drive plate. Thus, it is possible to provide an outboard engine system which enables support of a torque converter without using any bearing exclusively for supporting the overall weight of the torque converter, thereby reducing the cost.

10 Claims, 7 Drawing Sheets

OUTBOARD ENGINE SYSTEM

RELATED APPLICATION DATA

The present invention is based upon Japanese priority application Nos. 2006-145972, 2006-145973 and 2006-145974 which are hereby incorporated in their entirety herein by reference.

BACKGROUND OF THE INVENTION

1. Field of the Invention

The present invention relates to an outboard engine system comprising: a casing coupled to a swivel case via a swivel shaft; an engine mounted in an upper part of the casing such that a crankshaft of the engine is vertically arranged and a cylinder block of the engine faces in a direction opposite to the swivel shaft; a torque converter; a vertically arranged output shaft connected to the crankshaft through the torque converter; a horizontally arranged propeller shaft provided below the output shaft; and a forward-reverse shifting gear mechanism for providing a connection between the output shaft and the propeller shaft; the torque converter, the output shaft, the propeller shaft and the forward-reverse shifting gear mechanism being disposed in the casing.

2. Description of the Related Art

Such an outboard engine systems is already known as disclosed in U.S. Pat. No. 3,407,600.

In the outboard engine system disclosed in U.S. Pat. No. 3,407,600, a lower surface of a torque converter is supported via a bearing by a bracket which is connected to a casing, and thus the overall weight of the torque converter is borne by the bearing. Therefore, the outboard engine system requires an expensive bearing having a large load capacity, leading to a difficulty in reducing the cost.

SUMMARY OF THE INVENTION

The present invention has been achieved in view of the above problem, and has an object to provide an outboard engine system which enables support of a torque converter without using any bearing exclusively for supporting the overall weight of the torque converter, thereby reducing the cost.

In order to achieve the above object, according to a first feature of the present invention, there is provided an outboard engine system comprising: a casing coupled to a swivel case via a swivel shaft; an engine mounted in an upper part of the casing such that a crankshaft of the engine is vertically arranged and a cylinder block of the engine faces in a direction opposite to the swivel shaft; a torque converter; a vertically arranged output shaft connected to the crankshaft through the torque converter; a horizontally arranged propeller shaft provided below the output shaft; and a forward-reverse shifting gear mechanism for providing a connection between the output shaft and the propeller shaft; the torque converter, the output shaft, the propeller shaft and the forward-reverse shifting gear mechanism being disposed in the casing, wherein the torque converter includes: a pump impeller; a turbine runner arranged above the pump impeller and connected to the output shaft; a stator arranged between the pump impeller and the turbine runner; and a transmission cover integrally connected to an outer periphery of the pump impeller so as to cover an upper surface of the turbine runner; wherein a drive plate is secured at its central portion to a lower end of the crankshaft by a first bolt, and an outer peripheral portion of the drive plate is secured to the transmission cover by a second bolt; and wherein the torque converter is suspended from the crankshaft via the drive plate.

According to a second feature of the present invention, in addition to the first feature, the output shaft is divided into an upper output shaft spline-fitted to a hub of the turbine runner, and a lower output shaft spline-fitted to a lower end of the upper output shaft and connected to the forward-reverse shifting gear mechanism; and a bearing for supporting a downward load of the upper output shaft is attached to a support member integrally connected to the casing.

According to a third feature of the present invention, in addition to the first or second feature, a thrust needle bearing is provided between a hub of the pump impeller and a hub of the stator.

According to a fourth feature of the present invention, in addition to the first or second feature, a dish-shaped recess is formed in a central portion of the transmission cover so as to receive a head portion of the first bolt.

According to a fifth feature of the present invention, there is provided an outboard engine system comprising: a casing coupled to a swivel case via a swivel shaft; an engine mounted in an upper part of the casing such that a crankshaft of the engine is vertically arranged and a cylinder block of the engine faces in a direction opposite to the swivel shaft; a torque converter; a vertically arranged output shaft connected to the crankshaft through the torque converter; and a horizontally arranged propeller shaft provided below the output shaft; and a forward-reverse shifting gear mechanism for providing a connection between the output shaft and the propeller shaft; the torque converter, the output shaft, the propeller shaft and the forward-reverse shifting gear mechanism being disposed in the casing; wherein the torque converter includes: a pump impeller; a turbine runner arranged to be opposed to the pump impeller and connected to the output shaft; a stator arranged between the pump impeller and the turbine runner; and a transmission cover arranged to cover an rear surface of the turbine runner and providing a connection between the crankshaft and the pump impeller; and wherein an annular bag-shaped foreign material trap opening upward is formed in the pump impeller and an inner peripheral surface of a largest diameter portion of the transmission cover so that the trap can capture a foreign material separated from a working oil in the torque converter by centrifugation.

According to a sixth feature of the present invention, in addition to the fifth feature, the pump impeller and the transmission cover are coupled to each other by fitting to each other a male mating surface formed on an outer periphery of an enlarged diameter portion extending from an outer peripheral end of the pump impeller and a female mating surface formed on an inner periphery of a peripheral wall portion of the transmission cover, and then welding together the enlarged diameter portion and the peripheral wall portion, thereby forming an annular recess formed in an inner peripheral surface of the peripheral wall portion so as to be adjacent to the female mating surface; and an extension wall is formed on the enlarged diameter portion so as to cover the annular recess from the inner peripheral side, thereby defining the foreign material trap.

According to a seventh feature of the present invention, in addition to the sixth feature, the extension wall is formed to be thin and rise from an inner peripheral edge of the enlarged diameter portion.

According to an eighth feature of the present invention, in addition to the sixth feature, the enlarged diameter portion has a radially inwardly reduced diameter portion which constitutes an inner peripheral wall of the foreign material trap; and the peripheral wall portion has a radially outwardly increased diameter portion which constitutes an outer peripheral wall of the foreign material trap.

According to a ninth feature of the present invention, there is provided an outboard engine system comprising: a casing coupled to a swivel case via a swivel shaft; an engine mounted in an upper part of the casing such that a crankshaft of the engine is vertically arranged and a cylinder block of the engine faces in a direction opposite to the swivel shaft; a torque converter; a vertically arranged output shaft connected to the crankshaft through the torque converter; and a horizontally arranged propeller shaft provided below the output shaft; and a forward-reverse shifting gear mechanism for providing a connection between the output shaft and the propeller shaft; the torque converter, the output shaft, the propeller shaft and the forward-reverse shifting gear mechanism being disposed in the casing; wherein the torque converter includes: a pump impeller; a turbine runner arranged above the pump impeller so as to define a circulation circuit of a working oil between the turbine runner and the pump impeller, and connected to the output shaft; and a transmission cover arranged to cover an upper surface of the turbine runner and providing a connection between the crankshaft and the pump impeller; and wherein a clutch chamber which has a diameter larger than that of the circulation circuit is formed between the transmission cover and the turbine runner, and a lock-up clutch which has a diameter larger than that of the circulation circuit and which is capable of providing a direct connection between the transmission cover and the turbine runner is disposed in the clutch chamber.

According to a tenth feature of the present invention, in addition to the ninth feature, a cylindrical peripheral wall portion is integrally formed in the transmission cover so as to surround the turbine runner, an enlarged diameter wall is integrally formed in a shell of the pump impeller so as to radially extend from an outer peripheral end of the shell, and the peripheral wall portion and the enlarged diameter wall are coupled to each other to define an outer peripheral portion of the clutch chamber in which a frictional engagement portion of the lock-up clutch is disposed.

The support member and the frictional engagement portion correspond to a bearing bracket 14 and a friction lining 83 of a clutch piston 82, respectively, of an embodiment of the present invention which will be described later.

With the first feature of the present invention, because the torque converter is suspended from the crankshaft via the drive plate such that a lower end portion of the torque converter becomes free, the overall weight of the torque converter is borne by the crankshaft which is firmly supported by the crank case of the engine. Therefore, it is not necessary to use a dedicated bearing for supporting the overall weight of the torque converter, thereby reducing the cost. Also, even when the torque converter thermally expands in its axial direction, it is possible to prevent an excessive thrust load from acting on the torque converter and the crankshaft. Further, because the drive plate has an appropriate elasticity, elastic deformation of the drive plate alleviates shocks to the torque converter due to up-and-motion of a ship, thereby contributing to an improvement of durability.

With the second feature of the present invention, it is possible to prevent the weight of the output shaft from acting on the torque converter, drive plate and crankshaft, and also prevent the axial thermal expansion of the torque converter from affecting the output shaft. Further, the output shaft is divided into the upper output shaft which is spline-fitted to the hub of the turbine runner, and the lower output shaft which is spline-fitted to the lower end portion of the upper output shaft and is coupled to a forward-reverse shifting gear mechanism; and the downward load of the upper output shaft is supported by the bearing which is attached to a support member connected to the casing. Therefore, the axial thermal expansions of the torque converter, upper output shaft and lower output shaft are respectively absorbed by their spline-fitted portions, thereby preventing generation of overstress. Because the bearing supports only the downward load including the weight of the upper output shaft, the load is relatively small, thereby improving the durability of the bearing.

With the third feature of the present invention, the weights of the turbine runner and the stator are reasonably borne by the pump impeller via the thrust needle bearing, thereby improving the durability of the torque converter.

With the fourth feature of the present invention, because the head of the first bolt is received in the dish-shaped recess formed in the transmission cover, the drive plate and the transmission cover can be arranged close to each other without interference by the head of the first blot, thereby downsizing the power unit including the engine and the torque converter.

With the fifth feature of the present invention, the foreign materials having flowed into the torque converter are separated from the working oil by centrifugation and efficiently captured in the annular foreign material trap by a remarkably simple structure of the annular bag-shaped foreign material trap opening upward which is formed in the pump impeller and the inner peripheral surface of the largest diameter portion of the transmission cover. Further, because the torque converter is arranged vertically with its axis extending in the vertical direction, and the foreign material trap is formed into a bag-shape, the foreign materials once received in the foreign material trap are reliably kept to be captured therein, thereby preventing any clogging of an oil filter and a control valve due to the foreign materials.

With the sixth feature of the present invention, the foreign material trap can be easily formed by utilizing the coupled portions between the pump impeller and the transmission cover.

With the seventh feature of the present invention, the capacity of the foreign material trap can be increased without particularly increasing the outer diameter of the torque converter.

With the eighth feature of the present invention, the reduced diameter portion and the increased diameter portion serve as reinforcing ribs to increase the strength of the shell and the transmission cover, thereby improving their durability against the centrifugal force.

With the ninth feature of the present invention, a large torque is efficiently transmitted from the crankshaft to the output shaft via the lock-up clutch, by bringing into a connected state the lock-up clutch having a diameter larger than that of the circulation circuit of the torque converter, without particularly enlarging the pump impeller and the turbine runner. Further, because the lock-up clutch having a diameter larger than that of the circulation circuit of the torque converter is arranged above the pump impeller and the turbine runner, the pump impeller and the turbine runner can be arranged close to the swivel case by arranging the lock-up clutch above the swivel case, thereby downsizing the outboard engine system.

With the tenth feature of the present invention, the clutch chamber having a diameter larger than that of the circulation circuit can be easily formed by coupling together the peripheral wall portion of the transmission cover and the enlarged diameter wall of the shell of the pump impeller. Further, the frictional engagement portion of the lock-up clutch having a diameter larger than that of the circulation circuit can be easily disposed in the outer peripheral portion of the clutch chamber.

Furthermore, the enlarged diameter wall radially extending from the outer peripheral end of the shell of the pump impeller functions to reinforce the outer peripheral portion of the pump impeller, thereby contributing to an improvement of the durability of the pump impeller.

The above-mentioned object, other objects, characteristics, and advantages of the present invention will become apparent from a preferred embodiment, which will be described in detail below by reference to the attached drawings.

DESCRIPTION OF THE PREFERRED EMBODIMENT

Figure 1:
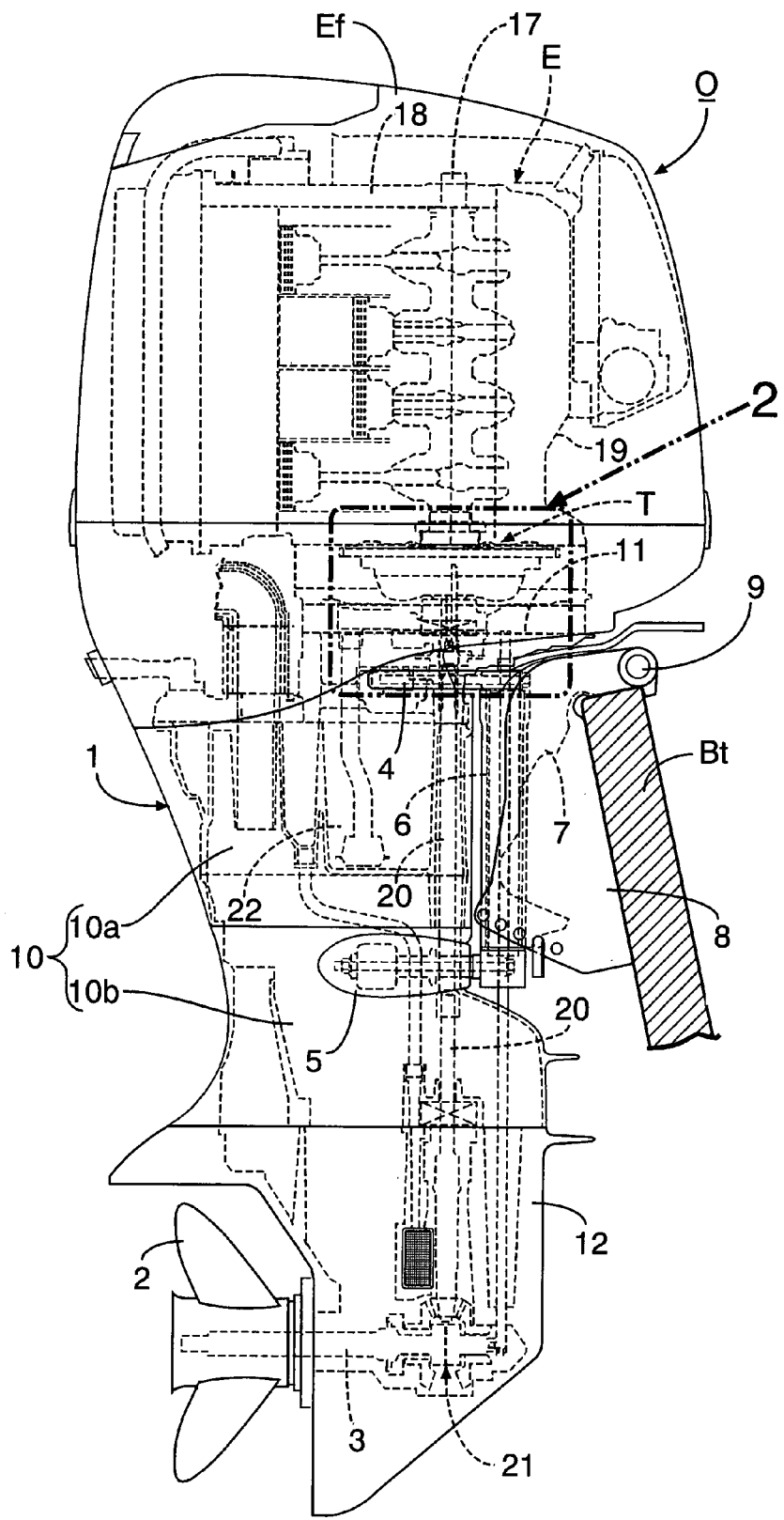
FIG. 1 is a side view showing an outboard engine system according to an embodiment of the present invention.

A first embodiment of the present invention will be described with reference to FIGS. 1 to 6. In FIG. 1, an outboard engine system O includes a casing 1 which has a water-cooled multi-cylinder four-stroke engine E mounted in its upper portion, and supports a propeller shaft 3 at its lower portion. The propeller shaft 3 has a propeller 2 provided at its rear end. A vertically-extending swivel shaft 6 is mounted to the casing 1 via an upper arm 4 and a lower arm 5 so as to situate in front of the casing 1. The swivel shaft 6 is rotatably supported by a swivel case 7 which is coupled to a stern bracket 8 via a horizontally-extending tilt shaft 9. The stern bracket 8 is cramped to a transom Bt of a body of a ship. Therefore, the casing 1 is horizontally rotatable around the swivel shaft 6, and vertically tiltable around the tilt shaft 9. The reference numeral Ef denotes a removable engine hood for covering the engine E.

Figure 2:
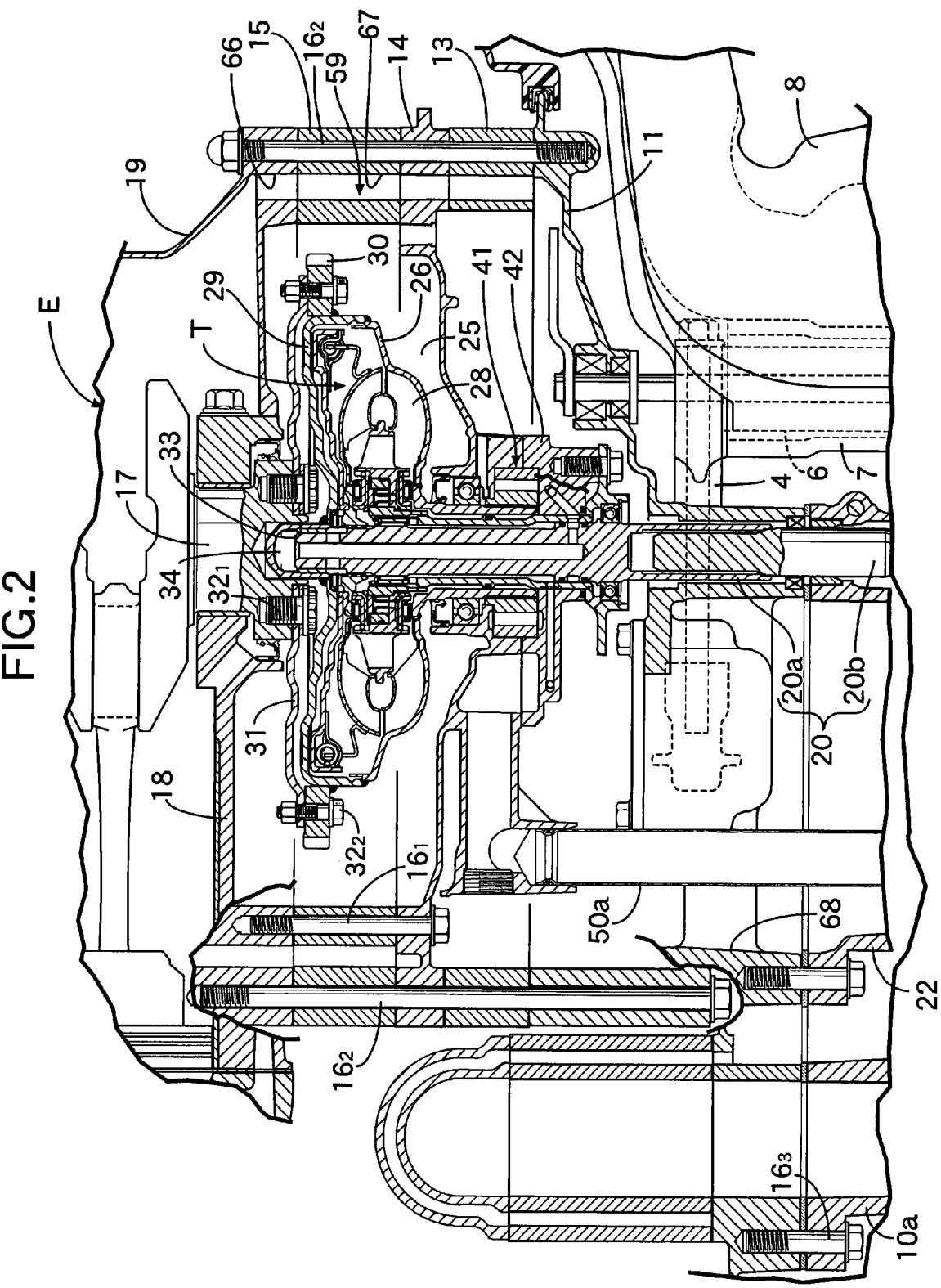
FIG. 2 is an enlarged sectional view showing the portion 2 of FIG. 1.

In FIG. 1 and FIG. 2, the above casing 1 includes the extension case 10, the mount case 11 bolt-coupled to an upper end of the extension case 10, and a gear case 12 bolt-coupled to a lower end of the extension case 10. The extension case 10 includes an upper case 10a and a lower case 10b bolt-coupled to the upper case 10a. The mount case 11 is jointed to an upper end surface of the upper case 10a by a plurality of bolts $16_3$.

The casing 1 further includes annular lower distance members 13, an bearing bracket 14, and annular upper distance members 15, which are sequentially superimposed on the upper end of the mount case 11. The engine E is mounted to the upper distance member 15 with the crankshaft 17 being vertically or perpendicularly arranged and the cylinder block 18 facing rearward. The bearing bracket 14 and upper distance member 15 are secured to the cylinder block 18 and a bottom wall of the crankcase 19 of the engine E by a plurality of bolts $16_1$. The lower distance member 13, the bearing bracket 14, and the upper distance member 15 are secured to one another by a plurality of bolts $16_2$.

The torque converter T is vertically arranged in the annular upper distance member 15, and the output shaft 20 coupled to the crankshaft 17 via the torque converter T is vertically arranged in the extension case 10.

The gear case 12 horizontally supports the propeller shaft 3 having the propeller 2 at its rear end, and houses a forward-reverse shifting gear mechanism 21 connecting the propeller shaft 3 to the output shaft 20.

In operation of the engine E, the power thereof is transmitted from the crankshaft 17 to the output shaft 20 via the torque converter T, and further to the propeller shaft 3 via the forward-reverse shifting gear mechanism 21, thereby driving the propeller 2. The rotational direction of the propeller 2 is controlled and switched by the forward-reverse shifting gear mechanism 21.

In the extension case 10, an oil tank 22 (see FIG. 1 and FIG. 4) open to the mount case 11 is integrally formed with the upper case 10a of the extension case 10. The oil tank 22 stores oil 23 which is used in both lubrication of the engine E and operation of the torque converter T.

Figure 3:
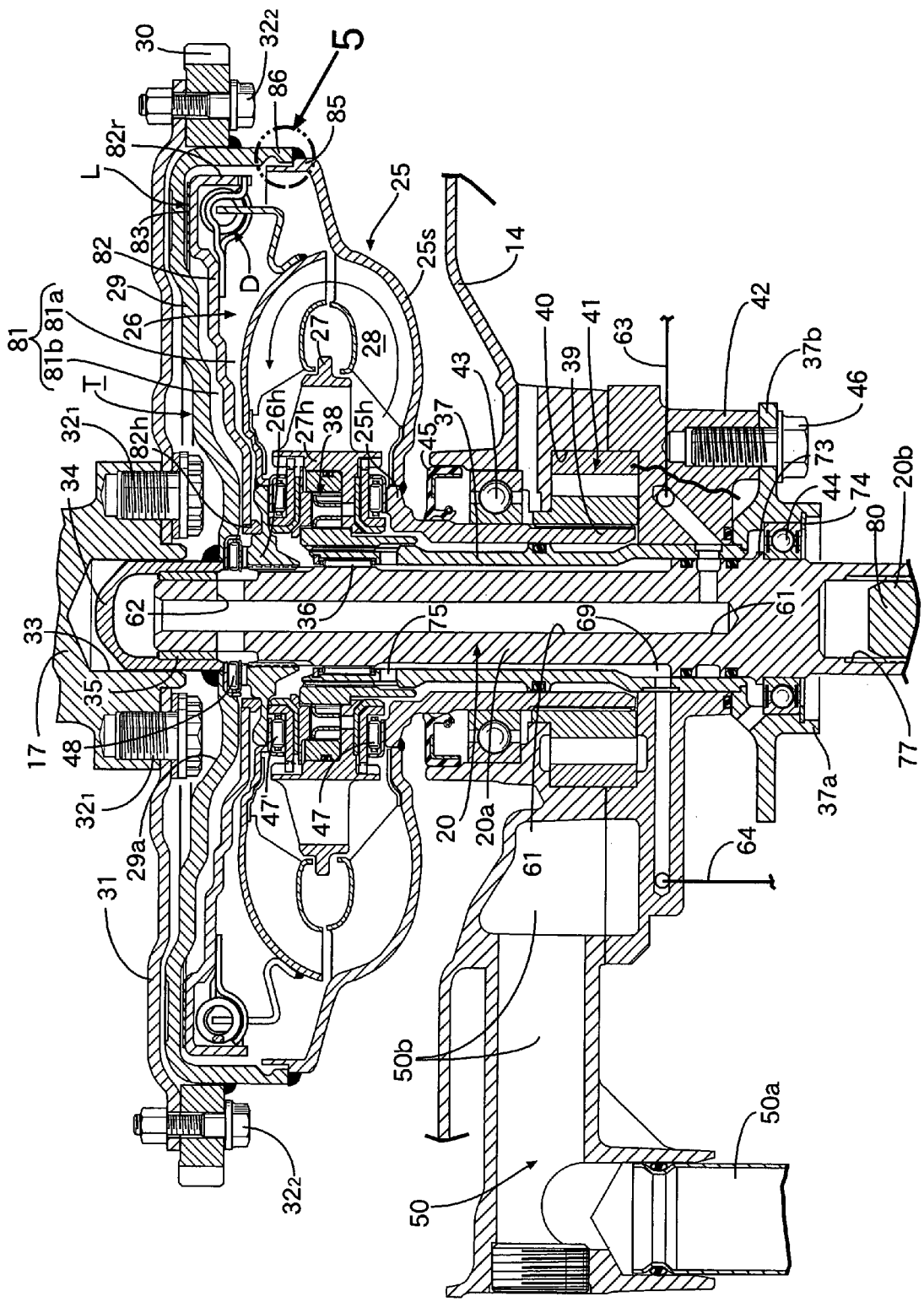
FIG. 3 is an enlarged view showing a torque converter in FIG. 2.

As clearly shown in FIG. 3, the torque converter T includes a pump impeller 25, a turbine runner 26 arranged above the pump impeller 25 and opposed to the pump impeller 25, a stator 27 arranged between the inner peripheral portions of the pump impeller 25 and the turbine runner 26, and a circulation circuit 28 of working oil which is defined between these three impellers 25 to 27. The three impellers 25 to 27 are arranged to have a common vertical axis, as in the case of the crankshaft 17 and the output shaft 20.

The pump impeller 25 integrally includes a transmission cover 29 for covering an upper surface of the turbine runner 3. A ring gear 30 for starting operation is secured to an outer peripheral surface of the transmission cover 29. A steel drive plate 31 is secured to the ring gear 30 by a plurality of annularly-arranged second bolts $32_2$. The drive plate 31 is also secured to a lower end of the crankshaft 17 by plurality of annularly-arranged first bolts $32_1$. The torque converter T is suspended from the crankshaft 17 via the drive plate 31. In this structure, a dish-shaped recess 29a is formed in a central portion of the transmission cover 29 so as to receive a head portion of the first bolts $32_1$, and the drive plate 31 is arranged close to the transmission cover 29.

A cup-shaped supporting cylinder 34 is secured to a central part of the transmission cover 29. The supporting cylinder 34 is slidably fitted into a supporting hole 33 which is open to the central part of the lower end surface of the crankshaft 17. The output shaft 20 has an upper end which extends to the inside of the supporting cylinder 34 and is supported in the supporting cylinder 34 via a bearing bush 35. A hub 26h of the turbine runner 26 is spline-coupled to the output shaft 20. A hollow stator shaft 37 is arranged around the outer periphery of the output shaft 20 so as to be supported by the output shaft 20 via a needle bearing 36. A known free wheel 38 is interposed between the stator shaft 37 and a hub 27h of the stator 27.

A hollow pump shaft 39 is arranged at the outer periphery of the stator shaft 37. The hollow pump shaft 39 is integrally coupled to the pump impeller 25 and extends downward. The pump shaft 39 is supported by the bearing bracket 14 via an upper ball bearing 43 on the side of the outer periphery. An oil pump 41 driven at the lower end portion of the pump shaft 39 is attached to a pump housing 40 formed at a lower surface of the bearing bracket 14. A pump cover 42 covering a lower surface of the oil pump 41 is bolt-coupled to a lower surface of the bearing bracket 14. In this structure, the pump shaft 39 is slidably fitted to an inner lace of an upper ball bearing 43, and is also slidably spline-fitted to a rotor of the oil pump 41. With this arrangement, the lower end of the torque converter T can be freely moved in the axial direction.

An oil seal 45 is attached to an upper end portion of the bearing bracket 14 such that its lip is in close contact with an outer peripheral surface of the pump shaft 39 at a position immediately above the ball bearing 43.

The stator shaft 37 has a large diameter portion 37a at its lower end. A flange 37b is integrally formed on an outer periphery of the large diameter portion 37a. The flange 37b is secured to the pump cover 42 by a bolt 46. A lower ball bearing 44 is mounted to its inner periphery of the flange 37b so as to support the output shaft 20.

Therefore, the pump shaft 39 is supported by the bearing bracket 14 via the upper ball bearing 43, and the output shaft 20 is supported by the large diameter portion 37a of the stator shaft 37 via the lower ball bearing 44, thereby reasonably supporting the pump shaft 39, the stator shaft 37, and the output shaft 20 and downsizing the vertical fluid power transmission including the torque converter T and output shaft 20.

Because the oil pump 41 is mounted to the bearing bracket 14 in a space between the upper and lower ball bearings 43 and 44, thereby downsizing the vertical fluid power transmission having the oil pump 41.

Thrust needle bearings 47 and 47' are interposed between the hubs 25h, 27h and 26h of the pump impeller 25, stator 27 and turbine runner 26. Also, a thrust needle bearing 48 is interposed between the hub 26h of the turbine runner 26 and the transmission cover 29.

Figure 4:
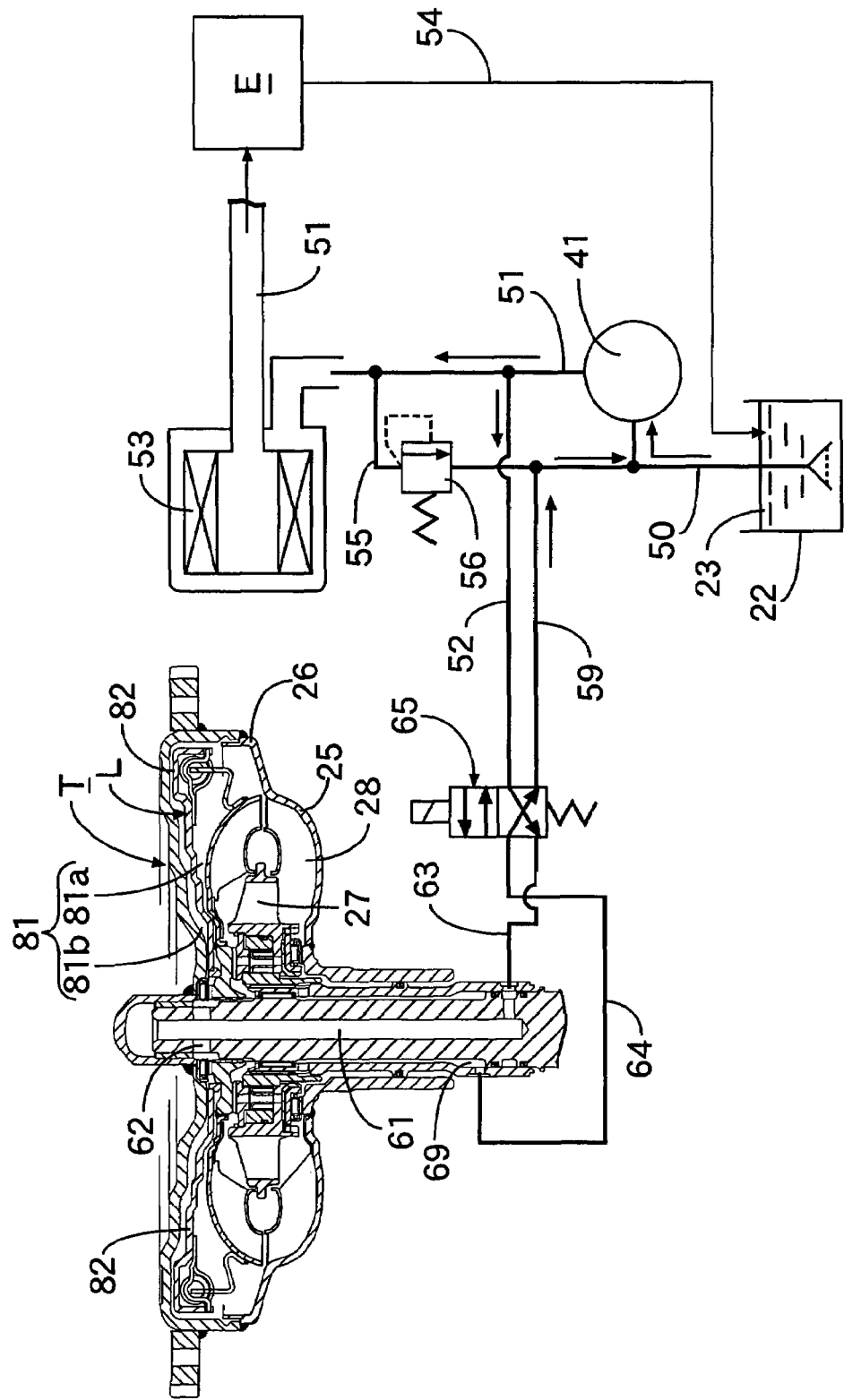
FIG. 4 is a view showing a hydraulic circuit including an oil pump.

In FIGS. 2 to 4, the oil pump 41 draws up oil stored in the oil tank 22 through the oil suction passage 50, and discharges the oil to a first oil supply passage 51. The oil discharged to first oil supply passage 51 is filtered by an oil filter 53 provided in the middle of the first oil supply passage 51, and supplied to a lubricated portion of the engine E. After the lubrication, the oil flows downward to the bottom portion of the crankcase 19 of the engine E, and returns to the oil tank 22 via a first oil return passage 54. An oil relief passage 55 is a branch from the first oil supply passage 51 upstream of the oil filter 53, and leads to the oil suction passage 50. The oil relief passage 55 has a pressure relief valve 56 which opens when an oil pressure of the first oil supply passage 51 exceeds a specified value.

A second oil supply passage 52 is connected to the first oil supply passage 51 so as to supply the working oil to the torque converter T. A second oil return passage 59 is connected to an intake side of the oil pump 41 so as to guide the oil returning from the torque converter T.

As shown in FIG. 3, a clutch oil chamber 81 is defined between the turbine runner 26 and the transmission cover 29. The clutch oil chamber 81 communicates at its outer peripheral portion with the circulation circuit 28. A cylindrical peripheral wall portion 86 is integrally formed in the transmission cover 29 so as to surround the turbine runner 26. A enlarged diameter wall 85 is integrally formed in the shell 25s of the pump impeller 25 so as to radially extend from the outer peripheral end of the shell 25s. The peripheral wall portion 86 and the enlarged diameter wall 85 are joined to each other to define a circular outer peripheral portion of the clutch chamber 81 which has a diameter larger than that of the circulation circuit 28. The clutch chamber 81 is provided with a lock-up clutch L which is capable of providing a direct connection between the turbine runner 26 and the transmission cover 29.

The lock-up clutch L comprises a disc-shaped clutch piston 82 having a diameter larger than that of the circulation circuit 28. The clutch piston 82 is disposed in the clutch oil chamber 81 so that the clutch oil chamber 81 is divided into an inside chamber 81a on the side of the turbine runner 26, and an outside chamber 81b on the side of the transmission cover 29. The clutch piston 82 has an annular friction lining 83 having a diameter larger than that of the circulation circuit 28 on its side surface which is opposed to the inner wall of the transmission cover 29. The clutch piston 82 also has a hub 82h slidably supported on the outer peripheral surface of the hub 26h of the turbine runner 26 so that the hub 82h is movable between a connected position where the friction lining 83 is pressure-pressed on the inner wall of the transmission cover 29 and a non-connected position where the friction lining 83 is separated from the inner wall. In this way, the lock-up clutch L is formed to have a diameter larger than that of the circulation circuit 28. As shown in FIG. 2, the torque converter T is arranged such that the pump impeller 25 and the turbine runner 26 are positioned close to the swivel case 7 and such that the lock-up clutch L is positioned above the swivel case 7.

An annular rim portion 82r is integrally formed at an outer peripheral end of the clutch piston 82, and bends toward the turbine runner 26. A known torque damper D is disposed within the rim portion 82r, and shock-absorbingly provides a connection between the clutch piston 82 and the turbine runner 26.

Figure 5:
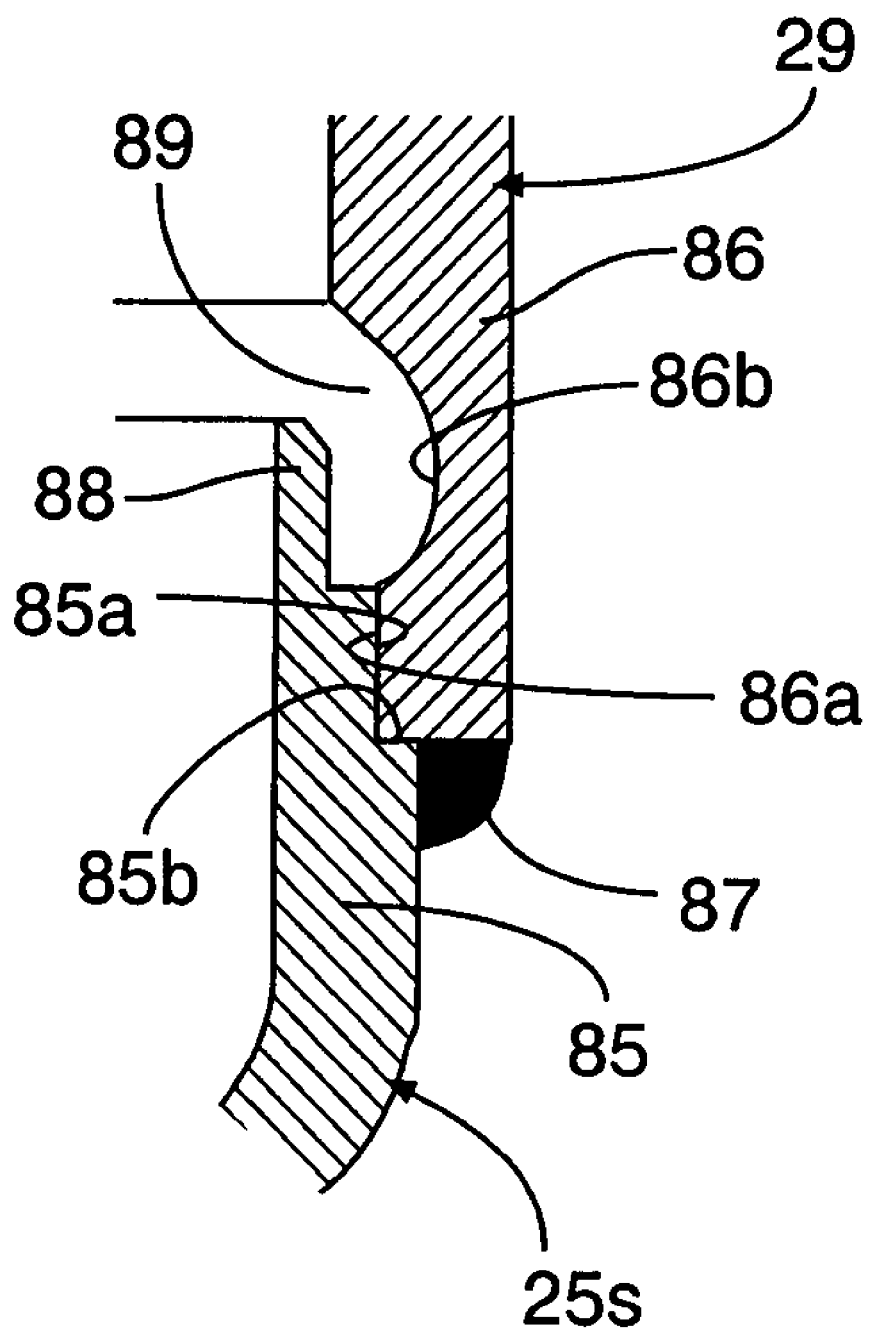
FIG. 5 is an enlarged sectional view showing the portion 5 (foreign material trap) in FIG. 3.

Now, with reference to FIG. 3 and FIG. 5, a coupling structure between the enlarged diameter wall 85 and the peripheral wall portion 86 will be described below.

Formed on an outer periphery of the enlarged diameter wall 85 are a male mating surface 85a and an annular positioning stepped portion 85b which radially extends from an inner end of the male mating surface 85a. The transmission cover 29 has a thickness larger than that of the shell 25s. Formed on an inner periphery of the peripheral wall portion 86 which is formed on an outer periphery of the transmission cover 29, are a female mating surface 86a which is connected to the outer periphery of the peripheral wall portion 86, and an annular recess 86b which is adjacent to an inner end of the female mating surface 86a.

Thus, in coupling together the shell 25s and the transmission cover 29, the male mating surface 85a of the enlarged diameter wall 85 of the shell 25s and the female mating surface 86a of the peripheral wall portion 86a of the transmission cover 29 are mated with each other, and the positioning stepped portion 85b of the enlarged diameter wall 85 is brought into contact with a tip surface of the peripheral wall portion 86. Then, a fillet weld 87 is formed along the entire mated portion between the tip end surface of the peripheral wall portion 86 and the outer peripheral surface of the enlarged diameter wall 85. In this way, the shell 25s and the transmission cover 29 are coupled to each other.

A thin and cylindrical extension wall 88 is integrally formed on the enlarged diameter wall 85 such that the extension wall 88 rises from the inner peripheral edge of the enlarged diameter wall 85 to cover the annular recess 86b from the inner peripheral side, whereby the annular recess 86b serves as a bag-shaped foreign material trap 89 having an upper end open to the interior of the transmission cover 29. In this way, the annular foreign material trap 89 which is open upward is formed between the pump impeller 25 and the inner periphery of the largest diameter portion of the transmission cover 29.

Referring again to FIG. 2 and FIG. 3, the output shaft 20 comprises: a bottomed vertical hole 61 positioned at a central portion of the output shaft 20; and a horizontal hole 62 which communicates the vertical hole 61 with the outside chamber 81b of the clutch oil chamber 81 via the thrust needle bearing 48. A cylindrical oil passage 69 is defined between the output shaft 20 and the stator shaft 37. The cylindrical oil passage 69 communicates with the inner periphery of the circulation circuit 28 via the horizontal hole 62 of the stator shaft 37, the thrust needle bearings 47, 47', and the needle bearing 36. First and second oil control passages 63 and 64 are connected to the vertical hole 61 and the cylindrical oil passage 69, respectively. As shown in FIG. 4, the first and second oil control passages 63 and 64 are alternately connected to the second oil supply passage 52 and a second oil return passage 59 by a lockup control valve 65.

As shown in FIG. 2, the oil suction passage 50 is suspended from the bearing bracket 14, and includes a suction tube 50a having a lower end portion extending into the oil tank 22, and a lateral oil passage 50b which is provided in the bearing bracket 14 so as to communicate the upper end portion of the suction tube 50a with a suction port 41a of the oil pump 41.

Further as shown in FIG. 2, an opening 66 is provided in a bottom wall of the crankcase 19 of the engine E. The oil having completed the lubrication of the engine E is discharged through the opening 66. The opening 66 is opened in the upper surface of the mount case 11 through a series of vertical through holes 67 which are formed in the upper distance member 15 and the peripheral portion of the bearing bracket 14, and through the inner side portion of the annular lower distance member 13. The mount case 11 has an opening 68 which is open to the oil tank 22. Therefore, the oil which flows into the bottom portion of the crankcase 19 after completing the lubrication of the engine E flows onto the mount case 11 through the opening 66, through holes 67 and opening 68, and returns through the opening 68 of the mount case 11 into the oil tank 22. The opening 66, the through holes 67, and the opening 68 form the first oil return passage 54 (see FIG. 4).

As shown in FIG. 2 and FIG. 3, the output shaft 20 is divided into an upper output shaft 20a having the vertical hole 61 and supported by the lower ball bearing 44, and a lower output shaft 20b coupled to the forward-reverse shifting gear mechanism 21 (see FIG. 1). A flange 73 is integrally formed in the upper output shaft 20a so as to support the upper end surface of an inner lace of the lower ball bearing 44 which is attached to the inner periphery of the large diameter portion 37a of the stator shaft 37. A stopper collar 74 is locked to the inner peripheral surface of the large diameter portion 37a so as to support the lower end surface of an outer lace of the lower ball bearing 44. Therefore, unless the stopper collar 74 is removed, the upper output shaft 20a cannot be pulled out downward from the central portion of the torque converter T.

A spline shaft 80 is formed at the upper end portion of the lower output shaft 20b. The spline shaft 80 is fitted into the spline hole 77 to couples the upper and lower output shafts 20a and 20b to each other.

Next, operation of this embodiment will be described below.

During idling operation or extremely low speed range operation of the engine, as shown in FIG. 4, the lockup control valve 65 is controlled by an electronical control unit (not shown) to connect the first oil control passage 63 to the second oil supply passage 52, and to connect the second oil control passage 64 to the second oil return passage 59.

The output torque of the crankshaft 17 of the engine is transmitted to the drive plate 31, the transmission cover 29, and the pump impeller 25 to drive these components to rotate, and also drives the oil pump 41. The driven oil pump 41 draws up the oil 23 in the oil tank 22 through the oil suction passage 50, and discharge the oil 23 to the first supply passage 51 and the second oil supply passage 52. The oil discharged to the first supply passage 51 is supplied to the portion to be lubricated in the engine E as described above.

Meanwhile, the oil supplied to the second oil supply passage 52 passes, as a working oil, through the lockup control valve 65, the first oil control passage 63, the vertical hole 61, and the horizontal hole 62, and sequentially flows through the outside chamber 81b and the inside chamber 81a of the clutch oil chamber 81 into the circulation circuit 28. After filling the circuit 28, the oil passes through the horizontal hole 75 and the cylindrical oil passage 69 to enter the second oil control passage 64, and returns to the second oil return passage 59 via the lockup control valve 65.

In the clutch oil chamber 81, the pressure in the outside chamber 81b is higher than that in the inside chamber 81a due to the flow of the working oil as described above, and the pressure difference pushes the clutch piston 82 in the direction away from the inner wall of the transmission cover 29. Therefore, the lock-up clutch L is in a non-connected state, and allows the pump impeller 25 and the turbine runner 26 to be relatively rotated. Thus, the rotation of the pump impeller 25 by the crankshaft 17 causes the working oil filled in the circulation circuit 28 to circulate within the circulation circuit 28 as shown by an arrow in FIG. 3, thereby transmitting the rotation torque of the pump impeller 25 to the turbine runner 26 to drive the output shaft 20. At this time, if the torque is amplified between the pump impeller 25 and the turbine runner 26, the reaction force due to the amplification is borne by the stator 27, whereby the stator 27 is fixed by the locking operation of the free wheel 38. Such a torque amplification effect of the torque converter T strongly drives the propeller 2, thereby effectively improving start and acceleration of the ship.

After the amplification of the torque, the stator 27 starts to rotate with the pump impeller 25 and the turbine runner 26 in the same direction while running idle the free wheel 38, because of reversal of the torque direction which the stator 27 receives.

When the torque converter T is in a coupled-state as described above, the lockup control valve 65 is switched by the electronical control unit. As a result, the working oil supplied to the second oil supply passage 52 flows through the lockup control valve 65 and the second oil control passage 64 into the circulation circuit 28, as opposed to the case described above. After filling the circuit 28, the oil enters the inside chamber 81a of the clutch oil chamber 81 to fill the inside chamber 81a. Meanwhile, the outside chamber 81b of the clutch oil chamber 81 is open to the second oil return passage 59 via the first oil control passage 63 and the lockup control valve 65, and thus in the clutch oil chamber 81, the pressure in the inside chamber 81a is higher than that in the outside chamber 81b. Therefore, the pressure difference pushes the clutch piston 82 toward the transmission cover 29, which causes the friction lining 83 to be pressure-pressed onto the inner wall of the transmission cover 29, whereby the lock-up clutch L enters a connected state. Then, the rotation torque transmitted from the crankshaft 17 to the pump impeller 25 is mechanically transmitted from the transmission cover 29 to the turbine runner 26 via the clutch piston 82 and the torque damper D, resulting in that the pump impeller 25 and the turbine runner 26 are directly coupled to each other. Therefore, it is possible to effectively transmit the output torque of the crankshaft 17 to the output shaft 20, thereby reducing fuel consumption.

In particular, because the lock-up clutch L is formed to have a diameter larger than that of the circulation circuit 28 of the torque converter T, a large torque is efficiently transmitted from the crankshaft 17 to the output shaft 20 via the lock-up clutch L by bringing the lock-up clutch L into the connected state, without particularly enlarging the pump impeller 25 and the turbine runner 26. Further, because the lock-up clutch L having a diameter larger than that of the circulation circuit 28 is arranged above the pump impeller 25 and the turbine runner 26, the pump impeller 25 and the turbine runner 26 can be arranged close to the swivel case 7 by arranging the lock-up clutch L above the swivel case 7, thereby downsizing the outboard engine system O.

The outer peripheral portion of the clutch chamber 81 is defined by coupling together the peripheral wall portion 86 of the transmission cover 29 and the enlarged diameter wall 85 of the shell 25s of the pump impeller 25. Therefore, it is possible to easily form the clutch chamber 81 having a diameter larger than that of the circulation circuit 28, and also to easily dispose, on the outer peripheral portion of the clutch chamber 81, the frictionally engaging portions of the lock-up clutch L having a diameter larger than that of the circulation circuit 28, that is, the friction lining 83 of the clutch piston 82 and the inner wall portion of the transmission cover 29 which is opposed to the friction lining 83. Further, the enlarged diameter wall 85 radially extends from the outer peripheral end of the shell 25s of the pump impeller 25 so as to reinforce the outer peripheral portion of the pump impeller 25, thereby contributing to an improvement of the durability of the pump impeller 25.

The oil circulates between the circulation circuit 28 of the torque converter T and the oil tank 22 arranged below the torque converter T through the second oil supply passage 52 and the second oil return passage 54. Therefore, it is possible to downsize the torque converter T, and promote the cooling of the circulating oil to prevent degradation of the oil.

In particular, since the oil tank 22 arranged below the torque converter T is separated from the engine E, the oil tank 22 is not much heated by the engine E, the oil tank 22 can have a relatively large capacity without any interference by the engine E and the torque converter T, and thus can increase the amount of oil flowing into the circulation circuit 28, thereby further promoting the cooling of the circulating oil. Further, the engine E, the torque converter T, and the oil tank 22 are sequentially arranged from top to bottom, and the torque converter T can be downsized without any interference by the oil tank 22, thereby reducing the size and weight of the outboard engine system O including these components.

The oil discharged from the oil pump 41 for lubricating the engine E is also supplied to the circulation circuit 28, which eliminates any addition/expansion of the oil tank 22 and the oil pump 41 for supplying the oil to the circulation circuit 28, thereby avoiding an increase of size and a complication of the outboard engine system O.

In the torque converter T, the turbine runner 26 is arranged above the pump impeller 25; the transmission cover 29 covering the turbine runner 26 is integrally connected to the shell 25s of the pump impeller 25; and the central portion of the drive plate 31 is fastened to the lower end of the crankshaft 17 by the first bolt $32_1$ and the outer peripheral portion thereof is fastened to the transmission cover 29 by the second bolt $32_2$, whereby the torque converter T is suspended from the crankshaft 17 via the drive plate 31 such that a lower end portion of the torque converter T becomes free. Therefore, the overall weight of the torque converter T is borne by the crankshaft 17 which is firmly supported by the crank case 19 of the engine E. Thus, it is not necessary to use a dedicated bearing for supporting the overall weight of the torque converter T, thereby reducing the cost. Also, even when the torque converter T thermally expands in its axial direction, it is possible to prevent an excessive thrust load from acting on the torque converter T and the crankshaft 17. Further, because the steel drive plate 31 has an appropriate elasticity, elastic deformation of the drive plate 31 alleviates shocks to the torque converter T due to up-and-motion of the ship, thereby contributing to an improvement of durability, thereby contributing to an improvement of durability.

The output shaft 20 is divided into the upper output shaft 20a which is spline-fitted to the hub 26h of the turbine runner 26, and the lower output shaft 20b which is spline-fitted to the lower end portion of the upper output shaft 20a and is connected to the forward-reverse shifting gear mechanism 21; and the flange 73 formed on the upper output shaft 20a is supported by the lower ball bearing 44 so as to support the downward load of the upper output shaft 20a. Therefore, it is possible to prevent the weight of the output shaft 20 from acting on the torque converter T, drive plate 31 and crankshaft 17, and also prevent the axial thermal expansion of the torque converter T from affecting the output shaft 20. Also, the axial thermal expansions of the torque converter T, upper output shaft 20a and lower output shaft 20b are respectively absorbed by their spline-fitted portions, thereby preventing generation of overstress. Further, because the lower ball bearing 44 supports only the downward load including the weight of the upper output shaft 20a, the load is relatively small, thereby improving the durability of the lower ball bearing 44.

Moreover, because the thrust needle bearing 47 is disposed between the respective hubs 25h and 27h of the pump impeller 25 and the stator 27, the weights of the turbine runner 26 and the stator 27 are reasonably borne by the pump impeller 25 via the thrust needle bearing 47, thereby improving the durability of the torque converter T.

Furthermore, because the dish-shaped recess 29a is formed in the central portion of the transmission cover 29 so as to receive the head portion of the first bolt $32_1$, the drive plate 31 and the transmission cover 29 can be arranged close to each other without interference by the head of the first blot $32_1$ by causing the head of the first bolt $32_1$ to be received in the dish shaped recess 29a in the transmission cover 29, thereby downsizing the power unit including the engine E and the torque converter T.

Even if a foreign material flows in the torque converter T and the lock-up clutch L, the foreign material is separated from the working oil by centrifugation, while circulating in the circulation circuit 28 along with the working oil, and the foreign material is efficiently received in the upwardly opened annular foreign material trap 89 which is formed between the pump impeller 25 and the inner peripheral surface of the largest diameter portion of the transmission cover 29. Further, because the torque converter T is vertically arranged with its axis extending in the vertical direction, and the foreign material trap 89 is formed into a bag-shape, the foreign materials once received in the foreign material trap 89 are reliably kept to be captured therein, thereby preventing any clogging of the oil filter 53 and the control valve 65 due to the foreign materials.

Because the foreign material trap 89 is formed from the annular recess 86b which is formed in the enlarged diameter wall 85 of the pump impeller 25 and the extension wall 88 which is formed on the peripheral wall portion 86 of the transmission cover 29, the enlarged diameter wall 85 and the peripheral wall portion 86 being fitted and welded to each other, it is possible to easily form the foreign material trap 89.

Also, in the present invention, the extension wall 88 rises from the inner peripheral edge of the enlarged diameter wall 85 and has a small wall thickness. Therefore, it is possible to increase the capacity of the foreign material trap 89 without increasing the outer diameter of the torque converter T.

Moreover, the engine E is mounted to the mount case 11 via the bearing bracket 14 supporting the pump shaft 39 of the torque converter T, the upper distance member 15 connected to the upper end of the bearing bracket 14 to surround the torque converter T, and the lower distance member 13 connected to the lower end of the bearing bracket 14. Therefore, it is possible to easily mount the engine E to the mount case 11 without any interference by the torque converter T, thereby providing an excellent assemblability.

Figure 6:
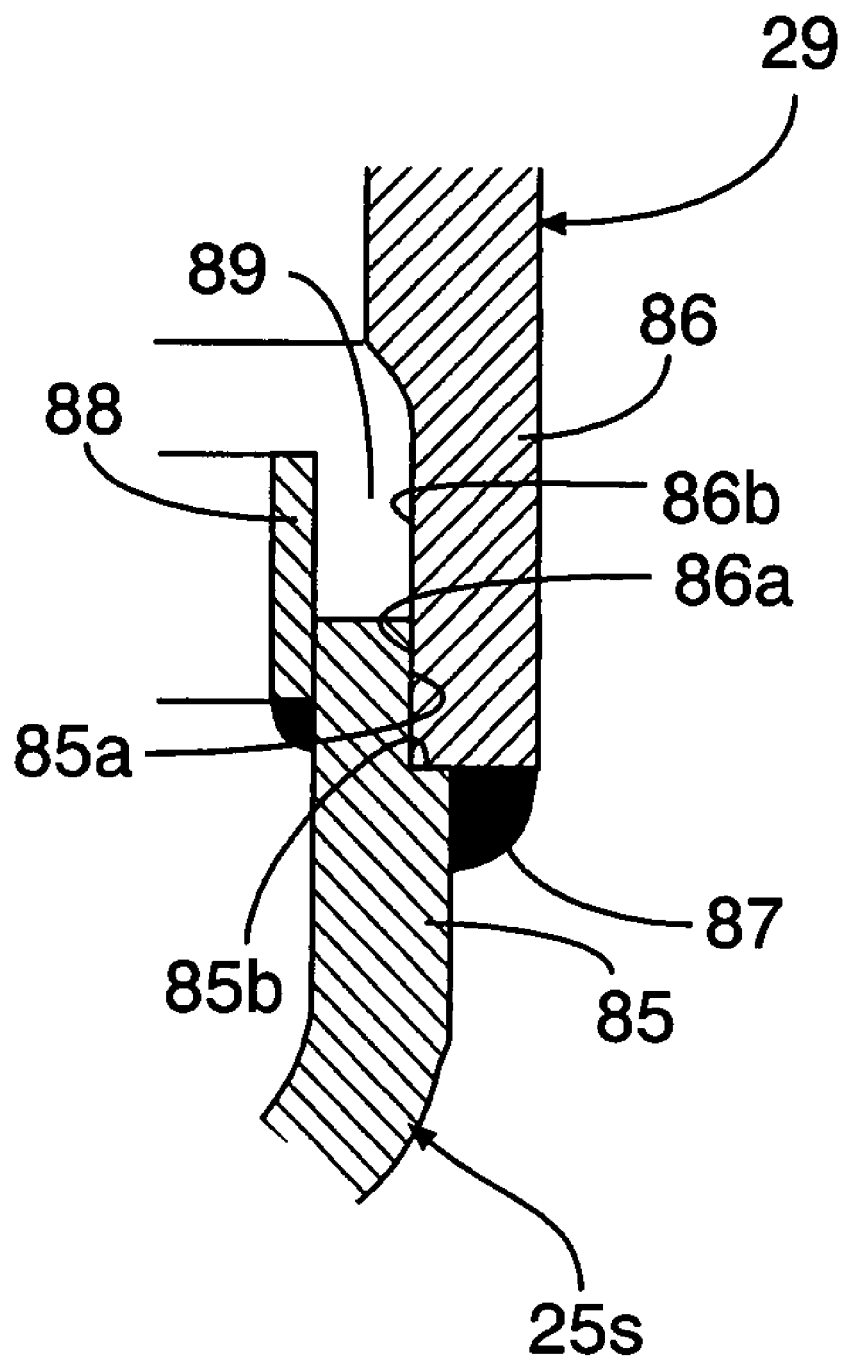
FIG. 6 is a view corresponding to FIG. 5, but showing a modification of the foreign material trap.

FIG. 6 is a view showing a modification of the foreign material trap 89. This modified foreign material trap includes a thin steel annular extension wall 88 which forms the inner peripheral wall of the foreign material trap 89, and the extension wall 88 is welded to the inner peripheral surface of the enlarged diameter wall 85 of the shell 25s. With this structure, the enlarged diameter wall 85 facing the foreign material trap 89 has a thickness which provides the lateral width of the foreign material trap 89, whereby the foreign material trap 89 can have a larger capacity.

Figure 7:
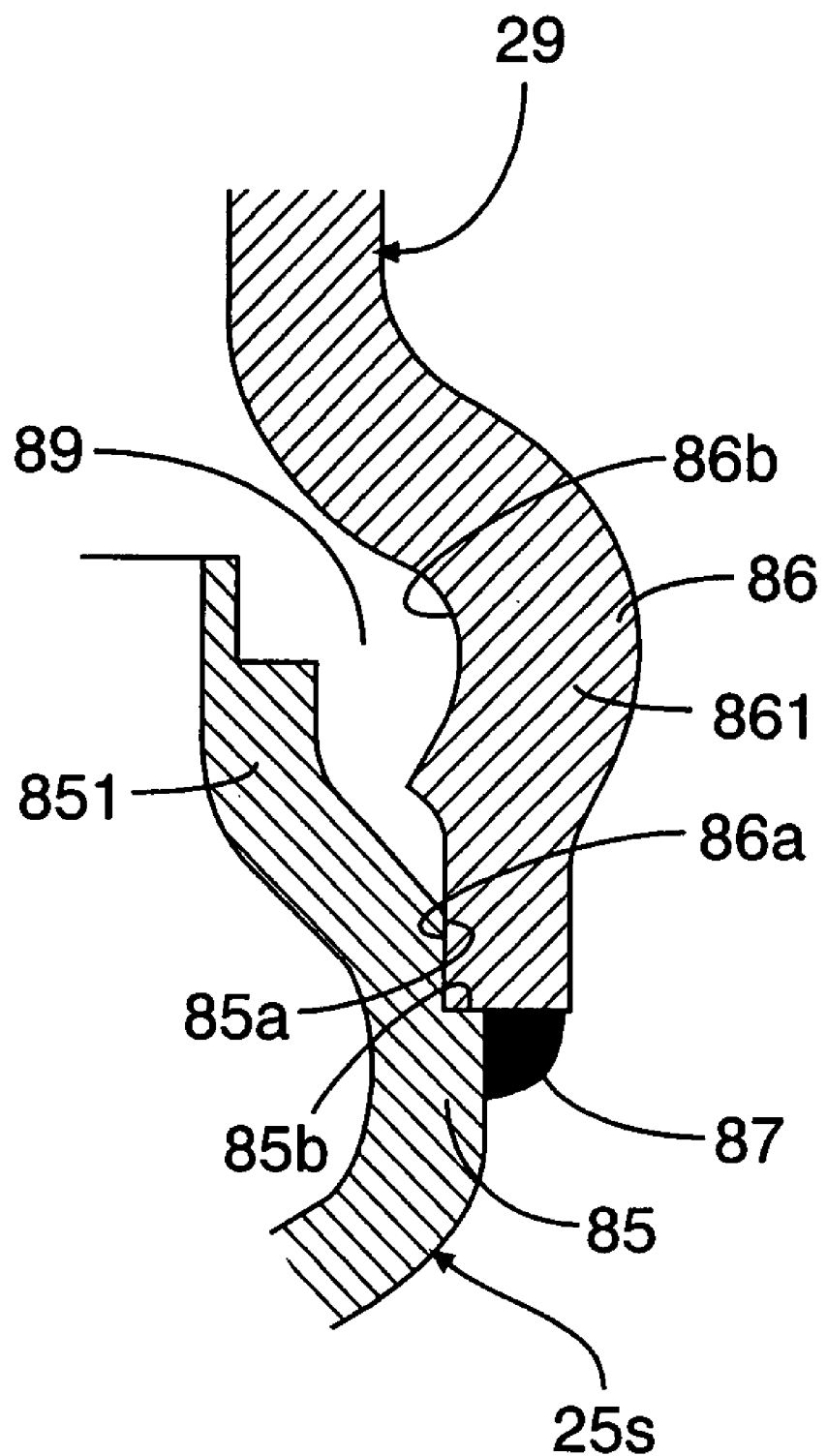
FIG. 7 is a view corresponding to FIG. 5, but showing another modification of the foreign material trap.

FIG. 7 is a view showing another modification of the foreign material trap 89. This modified foreign material trap includes: a radially inwardly reduced diameter portion 851 of the enlarged diameter wall 85 of the shell 25s, forming the inner peripheral wall of the foreign material trap 89; and a radially outwardly increased diameter portion 861 of the peripheral wall portion 86 of the transmission cover 29, forming the outer peripheral wall of the foreign material trap 89. With this structure, the capacity of the foreign material trap 89 is increased, and also the portions 851 and 861 function as reinforcing ribs to increase the strength of the shell 25s and the transmission cover 29, thereby improving the durability of these elements against centrifugal force.

The present invention is not limited to the above described embodiment, and various modifications in design can be made without departing from the subject matter of the present invention. For example, the oil tank 22 may be divided into a section for storing working oil for the torque converter T and a section for storing lubrication oil for the engine E, and oil suitable for each purpose is stored in each section.

What is claimed is:

1. An outboard engine system comprising:
   a casing coupled to a swivel case via a swivel shaft;
   an engine mounted in an upper part of the casing such that a crankshaft of the engine is vertically arranged and a cylinder block of the engine faces in a direction opposite to the swivel shaft;
   a torque converter;
   a vertically arranged output shaft connected to the crankshaft through the torque converter;
   a horizontally arranged propeller shaft provided below the output shaft; and
   a forward-reverse shifting gear mechanism for providing a connection between the output shaft and the propeller shaft;
   the torque converter, the output shaft, the propeller shaft and the forward-reverse shifting gear mechanism being disposed in the casing,
   wherein the torque converter includes:
      a pump impeller;
      a turbine runner arranged above the pump impeller and connected to the output shaft;
      a stator arranged between the pump impeller and the turbine runner; and
      a transmission cover integrally connected to an outer periphery of the pump impeller so as to cover an upper surface of the turbine runner;
   wherein a drive plate is secured at a central portion thereof to a lower end of the crankshaft by a first bolt, and an outer peripheral portion of the drive plate is secured to the transmission cover by a second bolt; and
   wherein an upper end portion of the torque converter is suspended from the crankshaft via the drive plate and a lower end portion of the torque converter is free, such that an overall weight of the torque converter is borne by the crankshaft.

2. The outboard engine system according to claim 1, wherein the output shaft is divided into an upper output shaft spline-fitted to a hub of the turbine runner, and a lower output shaft spline-fitted to a lower end of the upper output shaft and connected to the forward-reverse shifting gear mechanism; and a bearing for supporting a downward load of the upper output shaft is attached to a support member integrally connected to the casing.

3. The outboard engine system according to claim 1 or 2, wherein a thrust needle bearing is provided between a hub of the pump impeller and a hub of the stator.

4. The outboard engine system according to claim 1 or 2, wherein a dish-shaped recess is formed in a central portion of the transmission cover so as to receive a head portion of the first bolt.

5. An outboard engine system comprising:
   a casing coupled to a swivel case via a swivel shaft;
   an engine mounted in an upper part of the casing such that a crankshaft of the engine is vertically arranged and a cylinder block of the engine faces in a direction opposite to the swivel shaft;
   a torque converter;
   a vertically arranged output shaft connected to the crankshaft through the torque converter; and
   a horizontally arranged propeller shaft provided below the output shaft; and
   a forward-reverse shifting gear mechanism for providing a connection between the output shaft and the propeller shaft;
   the torque converter, the output shaft, the propeller shaft and the forward-reverse shifting gear mechanism being disposed in the casing;
   wherein the torque converter includes:
      a pump impeller;
      a turbine runner arranged to be opposed to the pump impeller and connected to the output shaft;
      a stator arranged between the pump impeller and the turbine runner; and
      a transmission cover arranged to cover an rear surface of the turbine runner and providing a connection between the crankshaft and the pump impeller; and
   wherein an annular bag-shaped foreign material trap opening upward is formed in the pump impeller and an inner peripheral surface of a largest diameter portion of the transmission cover so that the trap can capture a foreign material separated from a working oil in the torque converter by centrifugation.

6. The outboard engine system according to claim 5, wherein the pump impeller and the transmission cover are coupled to each other by fitting to each other a male mating surface formed on an outer periphery of an enlarged diameter portion extending from an outer peripheral end of the pump impeller and a female mating surface formed on an inner periphery of a peripheral wall portion of the transmission cover, and then welding together the enlarged diameter portion and the peripheral wall portion, thereby forming an annular recess formed in an inner peripheral surface of the peripheral wall portion so as to be adjacent to the female mating surface; and an extension wall is formed on the enlarged diameter portion so as to cover the annular recess from the inner peripheral side, thereby defining the foreign material trap.

7. The outboard engine system according to claim 6, wherein the extension wall is formed to be thin and rise from an inner peripheral edge of the enlarged diameter portion.

8. The outboard engine system according to claim 6, wherein the enlarged diameter portion has a radially inwardly reduced diameter portion which constitutes an inner peripheral wall of the foreign material trap; and the peripheral wall portion has a radially outwardly increased diameter portion which constitutes an outer peripheral wall of the foreign material trap.

9. An outboard engine system comprising:
a casing coupled to a swivel case via a swivel shaft;
an engine mounted in an upper part of the casing such that a crankshaft of the engine is vertically arranged and a cylinder block of the engine faces in a direction opposite to the swivel shaft;
a torque converter;
a vertically arranged output shaft connected to the crankshaft through the torque converter; and
a horizontally arranged propeller shaft provided below the output shaft; and
a forward-reverse shifting gear mechanism for providing a connection between the output shaft and the propeller shaft;
the torque converter, the output shaft, the propeller shaft and the forward-reverse shifting gear mechanism being disposed in the casing;
wherein the torque converter includes:
a pump impeller;
a turbine runner arranged above the pump impeller so as to define a circulation circuit of a working oil between the turbine runner and the pump impeller, and connected to the output shaft; and
a transmission cover arranged to cover an upper surface of the turbine runner and providing a connection between the crankshaft and the pump impeller; and
wherein a clutch chamber which has a diameter larger than that of the circulation circuit is formed between the transmission cover and the turbine runner, and a lock-up clutch which has a diameter larger than that of the circulation circuit and which is capable of providing a direct connection between the transmission cover and the turbine runner is disposed in the clutch chamber.

10. The outboard engine system according to claim 9, wherein a cylindrical peripheral wall portion is integrally formed in the transmission cover so as to surround the turbine runner, an enlarged diameter wall is integrally formed in a shell of the pump impeller so as to radially extend from an outer peripheral end of the shell, and the peripheral wall portion and the enlarged diameter wall are coupled to each other to define an outer peripheral portion of the clutch chamber in which a frictional engagement portion of the lock-up clutch is disposed.

* * * * *